US012572422B2

(12) United States Patent
Armangau et al.

(10) Patent No.: US 12,572,422 B2
(45) Date of Patent: Mar. 10, 2026

(54) DELAYED LOG WRITE OF INPUT/OUTPUTS USING PERSISTENT MEMORY

(71) Applicant: Dell Products L.P., Round Rock, TX (US)

(72) Inventors: Philippe Armangau, Kalispell, MT (US); Max Laier, Seattle, WA (US); Jonathan Walton, Seattle, WA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/633,334

(22) Filed: Apr. 11, 2024

(65) Prior Publication Data
US 2025/0321830 A1 Oct. 16, 2025

(51) Int. Cl.
| | |
|---|---|
| *G06F 11/10* | (2006.01) |
| *G06F 3/06* | (2006.01) |
| *G06F 11/14* | (2006.01) |
| *G06F 11/1446* | (2026.01) |
| *G06F 12/0868* | (2016.01) |

(52) U.S. Cl.
CPC ........ *G06F 11/1076* (2013.01); *G06F 3/0656* (2013.01); *G06F 11/1451* (2013.01); *G06F 11/1456* (2013.01); *G06F 12/0868* (2013.01)

(58) Field of Classification Search
CPC .............. G06F 11/1076; G06F 11/108; G06F 11/1451; G06F 11/1456; G06F 11/1469; G06F 11/1471; G06F 3/061–0613; G06F 3/0656; G06F 12/0804; G06F 12/0866; G06F 12/0868
See application file for complete search history.

(56) References Cited

U.S. PATENT DOCUMENTS

| | | | | |
|---|---|---|---|---|
| 7,562,200 B1 * | 7/2009 | Chatterjee | ............. | G06F 3/0623 |
| | | | | 711/163 |
| 9,720,596 B1 * | 8/2017 | Bono | ...................... | G06F 3/064 |
| 11,513,729 B1 * | 11/2022 | Ben-Yehuda | ......... | G06F 3/0656 |

(Continued)

OTHER PUBLICATIONS

Handy, Jim. "What is Write Amplification?" The SSD Guy Blog. Mar. 21, 2023. [https://thessdguy.com/what-is-write-amplification/], retrieved Jul. 4, 2024, 12 pages.

*Primary Examiner* — Marc Duncan
*Assistant Examiner* — Albert Li
(74) *Attorney, Agent, or Firm* — Amin, Turocy & Watson, LLP

(57) ABSTRACT

A system can maintain a data storage system, wherein the data storage system comprises persistent memory and chunk storage, wherein the persistent memory is more performant than the chunk storage, wherein the chunk storage stores data in chunks of a fixed-size, and wherein respective chunks of the chunks correspond to respective parity values. The system can, based on receiving a request associated with a storage account to write data to the data storage system, write the data to the persistent memory concurrently with writing the data to the chunk storage. The system can, after completing writing the data to the persistent memory and before completing writing the data to the chunk storage, send an indication, to the storage client, that the data has been successfully stored in the data storage system.

20 Claims, 14 Drawing Sheets

(56)                    References Cited

U.S. PATENT DOCUMENTS

2015/0046670 A1*    2/2015   Kim ................... G06F 12/0246
                                                              711/207
2017/0371585 A1*   12/2017   Lazo .................. G06F 12/0246
2021/0173776 A1*    6/2021   Li ....................... G06F 12/1009
2021/0191851 A1*    6/2021   Li ........................... G06F 9/544
2021/0199493 A1*    7/2021   Radovanovic ...... G06F 12/0804
2023/0333783 A1*   10/2023   Bert ..................... G06F 3/0689
2024/0086110 A1*    3/2024   Qi ........................ G06F 3/0611

* cited by examiner

100
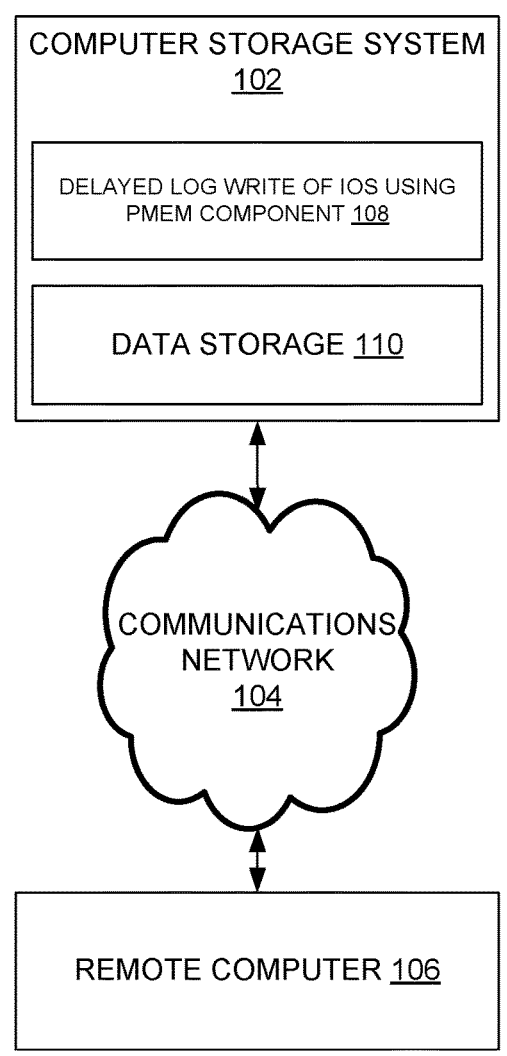
COMPUTER STORAGE SYSTEM
102
DELAYED LOG WRITE OF IOS USING
PMEM COMPONENT 108
DATA STORAGE 110
COMMUNICATIONS
NETWORK
104
REMOTE COMPUTER 106
FIG. 1

DELAYED LOG WRITE OF IOS USING
PMEM COMPONENT 514
CHUNK/
STRIPE
502
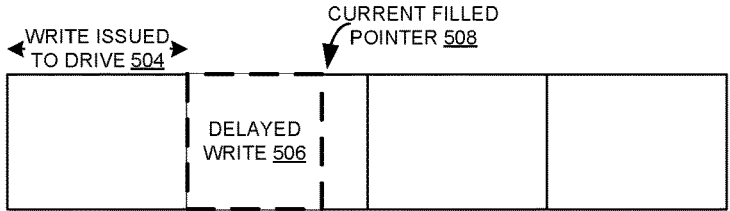
WRITE ISSUED
TO DRIVE 504
CURRENT FILLED
POINTER 508
DELAYED
WRITE 506
4+P RAID
510
CHUNK-
LET SIZE
512
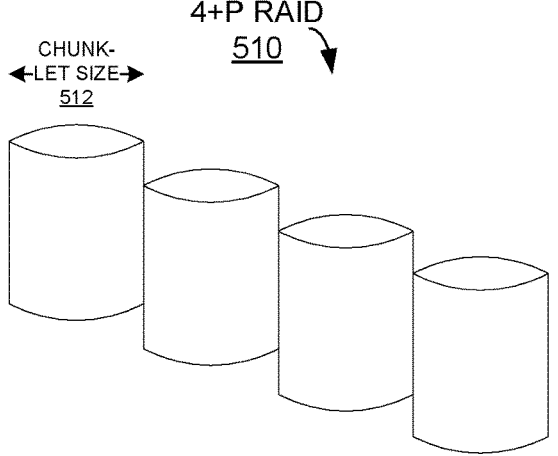
FIG. 5

600

DELAYED LOG WRITE OF IOS USING
PMEM COMPONENT 642

—TX→ MD TX JOURNAL 610

DATA BUFFER 608

ASYNC DATA

CHUNK 612A

CHUNK 612B

CHUNK 612C

CHUNK 612D    P 640

PMEM CHUNK STREAMS 614

CHUNK —STREAM ID 618

CHUNK STREAM 616

CHUNK COLLECTION 620

CHUNK 622

DEDUP/ COMPRESS. 606

DATA BUFFER 604

FREE CHUNK (ON SSD) 630

FILE INJEST 602

CHUNK ALLOCATOR 628

CHUNK DESCRIPTOR 632

CHUNK STATE: FREE, INGESTING, FILLED 634
CHUNK STREAM ID 636
LAST OFFSET 638

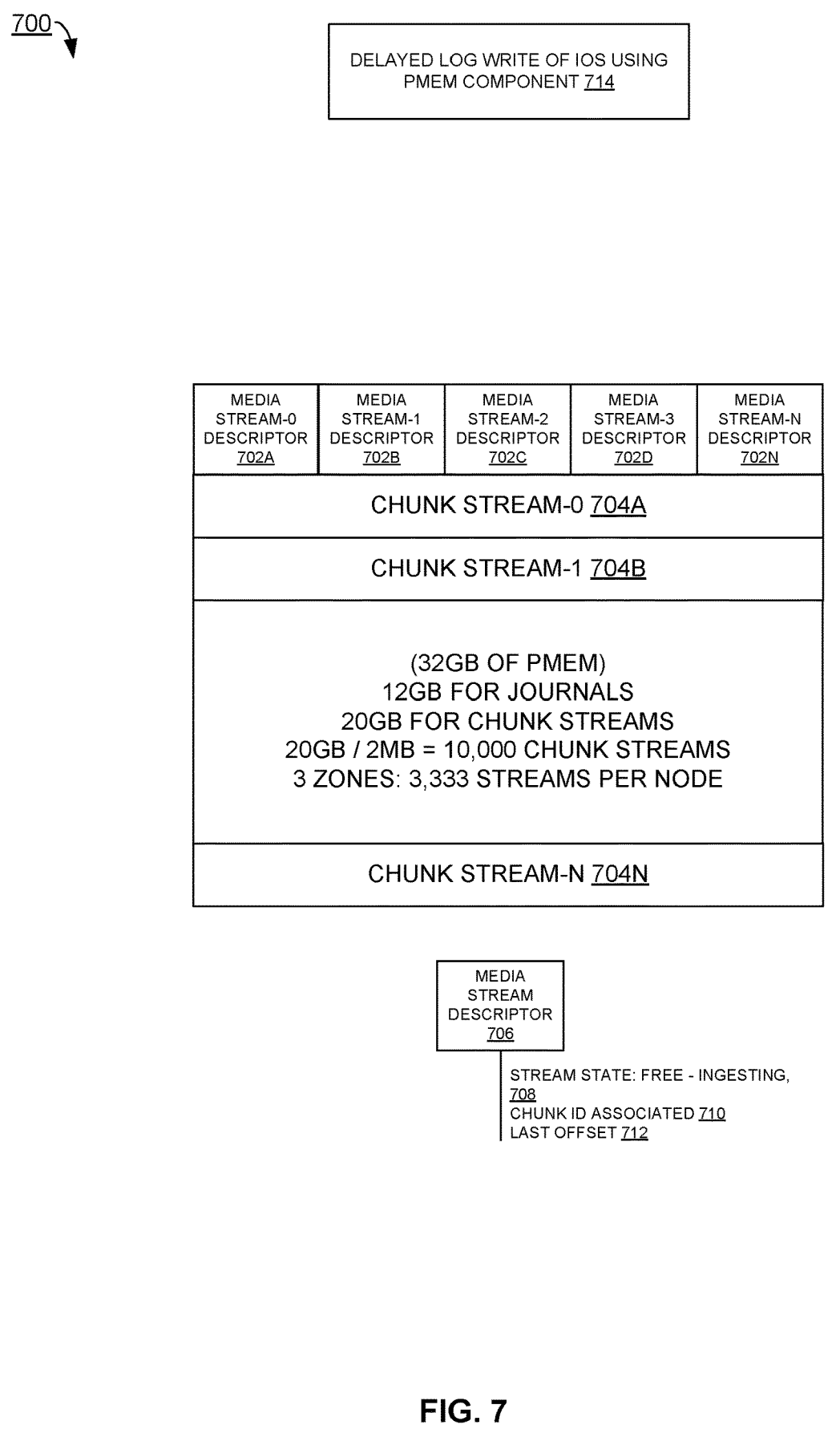

700

DELAYED LOG WRITE OF IOS USING PMEM COMPONENT 714

| MEDIA STREAM-0 DESCRIPTOR 702A | MEDIA STREAM-1 DESCRIPTOR 702B | MEDIA STREAM-2 DESCRIPTOR 702C | MEDIA STREAM-3 DESCRIPTOR 702D | MEDIA STREAM-N DESCRIPTOR 702N |
|---|---|---|---|---|

CHUNK STREAM-0 704A

CHUNK STREAM-1 704B (32GB OF PMEM)
12GB FOR JOURNALS
20GB FOR CHUNK STREAMS
20GB / 2MB = 10,000 CHUNK STREAMS
3 ZONES: 3,333 STREAMS PER NODE

CHUNK STREAM-N 704N

MEDIA STREAM DESCRIPTOR 706

STREAM STATE: FREE - INGESTING, 708
CHUNK ID ASSOCIATED 710
LAST OFFSET 712

FIG. 7

900

```
┌─────────────────┐      ┌─────────────────┐
│  SYNC REQUEST   │ ───► │   DATA SYNC     │
│  QUEUE 902      │      │   REQUEST       │
└─────────────────┘      │   904           │
                         └─────────────────┘
                                  │
                                  ▼
                           ┌──────────┐
                           │   LIN    │
                           │ ATTACHED │           ┌──────────────┐
                           │  TO A    │ ──N──►    │ ASSIGN CHUNK │
                           │ STREAM?  │           │ STREAM 908   │
                           │  906     │           └──────────────┘
                           └──────────┘                  │
                                  │Y                     ▼
                                  │              ┌──────────┐        ┌──────────────┐
                                  │              │   NEW    │        │ PRE-ALLOCATE │
                                  │◄──── N ──────│  STREAM  │──Y──►  │ CHUNK (IN    │
                                  │              │ ASSIGNED?│        │ MEMORY) 912  │
                                  ▼              │  910     │        └──────────────┘
                                  │              └──────────┘                │
                                  │◄──────────────────────────────────────────┘
                                  ▼
                         ┌─────────────────┐
                         │ PRE-ALLOCATE    │
                         │ VIRTUAL CHUNK   │
                         │ POINTERS 914    │
                         └─────────────────┘
                                  │
                                  ▼
                         ┌─────────────────┐
                         │  FILL STREAM    │
                         │ AND CHUNK 916   │
                         └─────────────────┘
                                  │
                                  ▼
  ┌──────────────┐         ┌──────────┐         ┌──────────────┐
  │ FINISH WRITE │         │  CHUNK   │         │ WRITE STREAM │
  │ CHUNK (WITH  │◄──Y─────│ FULL? 918│──N──►   │ X3 926 (512  │
  │ PARITY) 920  │         └──────────┘         │ BIT ALIGNED) │
  └──────────────┘                              └──────────────┘
         │                                              │
         ▼                                              ▼
    ┌────────┐                              ┌────────────────────┐
    │  SYNC  │                              │ Tx: CHUNK-ID       │
    │ POINT  │                              │ INGESTING /        │
    │  922   │                              │ STREAM-ID          │
    └────────┘                              │ EXTEND             │
         │                                  │ INGESTED /         │
         ▼                                  │ VIRTUAL:           │
  ┌──────────────┐                          │ EXTENT             │
  │ Tx: CHUNK-ID │                          │ INGESTED / LEAF    │
  │ FILLED /     │                          │ UPDATE / INODE     │
  │ VIRTUAL:     │                          │ UPDATE 928         │
  │ INGEST       │                          └────────────────────┘
  │ EXTENT /     │                                    │
  │ STREAM-ID:   │         ┌──────────┐               │
  │ FREE / LEAF  │ ──────► │   END    │ ◄─────────────┘
  │ UPDATE / INODE│        │   930    │
  │ UPDATE 924   │         └──────────┘
  └──────────────┘
```

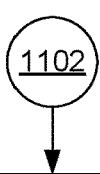

MAINTAINING A DATA STORAGE SYSTEM, WHEREIN THE DATA STORAGE SYSTEM COMPRISES PERSISTENT MEMORY AND CHUNK STORAGE, WHEREIN THE PERSISTENT MEMORY IS MORE PERFORMANT THAN THE CHUNK STORAGE, WHEREIN THE CHUNK STORAGE STORES DATA IN CHUNKS OF A FIXED-SIZE, AND WHEREIN RESPECTIVE CHUNKS OF THE CHUNKS CORRESPOND TO RESPECTIVE PARITY VALUES 1104

BASED ON RECEIVING A REQUEST ASSOCIATED WITH A STORAGE CLIENT TO WRITE DATA TO THE DATA STORAGE SYSTEM, WRITING THE DATA TO THE PERSISTENT MEMORY CONCURRENTLY WITH WRITING THE DATA TO THE CHUNK STORAGE 1106

AFTER COMPLETING WRITING THE DATA TO THE PERSISTENT MEMORY AND BEFORE COMPLETING WRITING THE DATA TO THE CHUNK STORAGE, SENDING AN INDICATION, TO THE STORAGE CLIENT, THAT THE DATA HAS BEEN SUCCESSFULLY STORED IN THE DATA STORAGE SYSTEM 1108

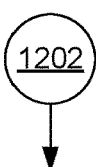

1202

MAINTAINING A DATA STORAGE SYSTEM, WHEREIN THE DATA STORAGE SYSTEM COMPRISES PERSISTENT MEMORY AND CHUNK STORAGE, WHEREIN THE PERSISTENT MEMORY IS MORE PERFORMANT THAN THE CHUNK STORAGE, WHEREIN THE CHUNK STORAGE STORES DATA IN CHUNKS OF A FIXED-SIZE, AND WHEREIN RESPECTIVE CHUNKS OF THE CHUNKS CORRESPOND TO RESPECTIVE PARITY VALUES 1204

BASED ON RECEIVING A REQUEST TO WRITE DATA TO THE DATA STORAGE SYSTEM, WRITING THE DATA TO THE PERSISTENT MEMORY CONCURRENTLY WITH WRITING THE DATA TO THE CHUNK STORAGE 1206

AFTER COMPLETING WRITING THE DATA TO THE PERSISTENT MEMORY AND BEFORE COMPLETING WRITING THE DATA TO THE CHUNK STORAGE, SENDING AN ACKNOWLEDGMENT THAT THE DATA HAS BEEN SUCCESSFULLY STORED IN THE DATA STORAGE SYSTEM TO AN ENTITY ASSOCIATED WITH THE REQUEST 1208

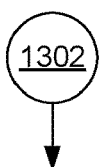

BASED ON RECEIVING A REQUEST TO WRITE DATA TO A DATA STORAGE SYSTEM THAT COMPRISES A PERSISTENT MEMORY AND A CHUNK STORAGE, WRITING THE DATA TO THE PERSISTENT MEMORY IN PARALLEL WITH WRITING THE DATA TO THE CHUNK STORAGE 1304

AFTER COMPLETING WRITING THE DATA TO THE PERSISTENT MEMORY AND BEFORE COMPLETING WRITING THE DATA TO THE CHUNK STORAGE, SENDING AN ACKNOWLEDGMENT THAT THE DATA HAS BEEN SUCCESSFULLY STORED IN THE DATA STORAGE SYSTEM TO AN ENTITY ASSOCIATED WITH THE REQUEST 1306

DELAYED LOG WRITE OF INPUT/OUTPUTS USING PERSISTENT MEMORY

BACKGROUND

A computer system can store computer data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a data storage system, wherein the data storage system comprises persistent memory and chunk storage, wherein the persistent memory is more performant than the chunk storage, wherein the chunk storage stores data in chunks of a fixed-size, and wherein respective chunks of the chunks correspond to respective parity values. The system can, based on receiving a request associated with a storage client to write data to the data storage system, write the data to the persistent memory concurrently with writing the data to the chunk storage. The system can, after completing writing the data to the persistent memory and before completing writing the data to the chunk storage, send an indication, to the storage client, that the data has been successfully stored in the data storage system.

An example method can comprise maintaining, by a system comprising at least one processor, a data storage system, wherein the data storage system comprises persistent memory and chunk storage, wherein the persistent memory is more performant than the chunk storage, wherein the chunk storage stores data in chunks of a fixed-size, and wherein respective chunks of the chunks correspond to respective parity values. The method can further comprise, based on receiving a request to write data to the data storage system, writing, by the system, the data to the persistent memory concurrently with writing the data to the chunk storage. The method can further comprise, after completing writing the data to the persistent memory and before completing writing the data to the chunk storage, sending, by the system, an acknowledgment that the data has been successfully stored in the data storage system to an entity associated with the request.

An example non-transitory computer-readable medium can comprise instructions that, in response to execution, cause a system comprising a processor to perform operations. These operations can comprise, based on receiving a request to write data to a data storage system that comprises a persistent memory and a chunk storage, writing the data to the persistent memory in parallel with writing the data to the chunk storage. These operations can further comprise, after completing writing the data to the persistent memory and before completing writing the data to the chunk storage, sending an acknowledgment that the data has been successfully stored in the data storage system to an entity associated with the request.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate delayed log write of inputs/outputs (IOs) using persistent memory (PMEM), in accordance with an embodiment of this disclosure.

FIG. 5 illustrates an example system architecture of a chunk being filled when IO to the chunk is delayed, and that can facilitate delayed log write of IOs using PMEM, in accordance with an embodiment of this disclosure;

FIG. 7 illustrates an example system architecture of a symmetrical partition format, and that can facilitate delayed log write of IOs using PMEM, in accordance with an embodiment of this disclosure;

FIG. 9 illustrates an example process flow for data buffer signal flow, and that can facilitate delayed log write of IOs using PMEM, in accordance with an embodiment of this disclosure;

FIG. 11 illustrates an example process flow that can facilitate delayed log write of IOs using PMEM, in accordance with an embodiment of this disclosure;

FIG. 12 illustrates another example process flow that can facilitate delayed log write of IOs using PMEM, in accordance with an embodiment of this disclosure;

FIG. 13 illustrates another example process flow that can facilitate delayed log write of IOs using PMEM, in accordance with an embodiment of this disclosure;

DETAILED DESCRIPTION

Overview

Figure 2:
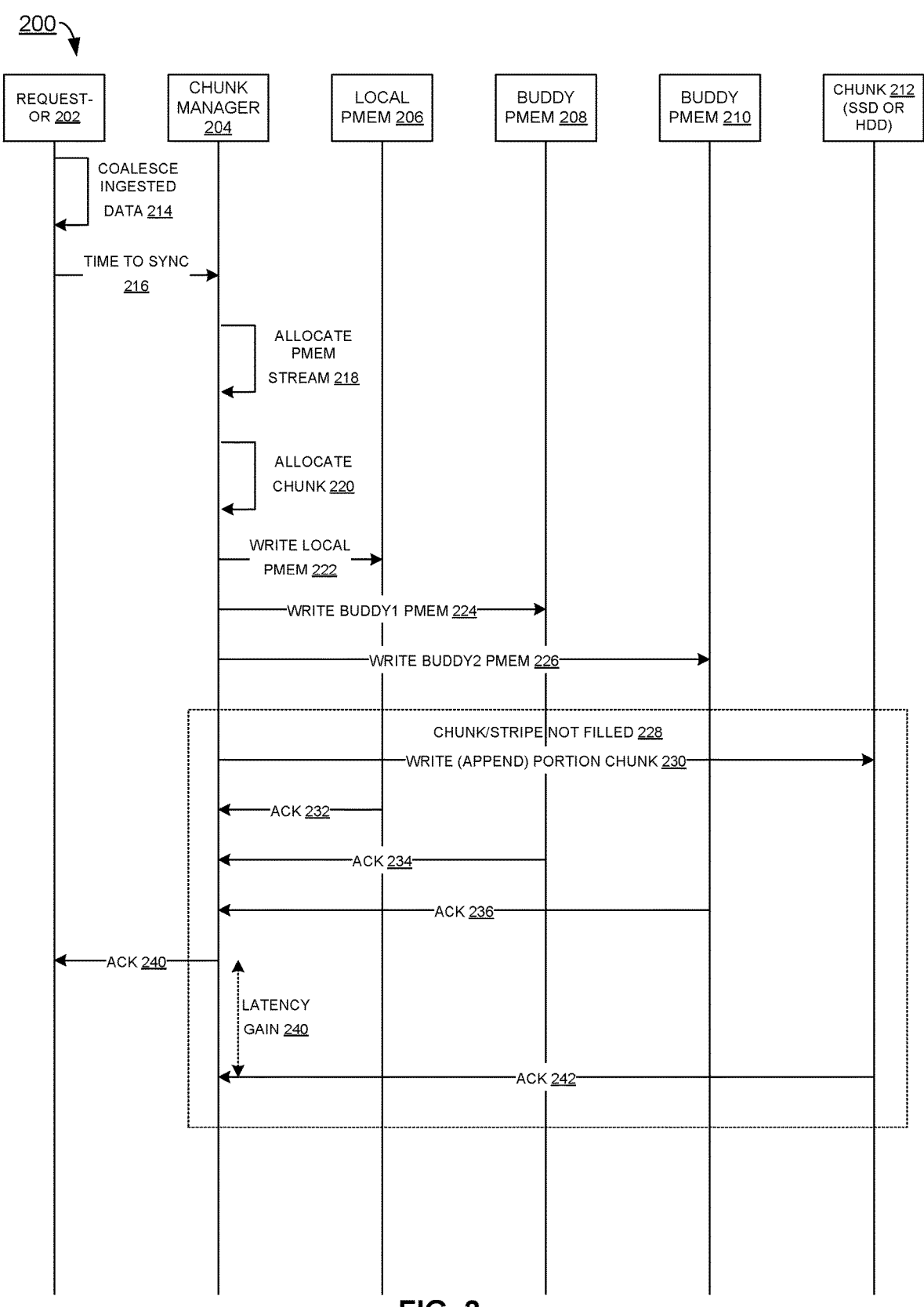
FIG. 2 illustrates an example signal flow of delaying log writes until a stripe or chunk is completely formed, to achieve a latency gain, and that can facilitate delayed log write of IOs using PMEM, in accordance with an embodiment of this disclosure.

The present techniques can be implemented to facilitate an ingest tier (IT) approach for an operation of delayed log write of small input/outputs (IOs) leveraging persistent memory (PMEM). Relative to prior approaches, this can shorten a process where an investment involved in developing IT can be costly. The present techniques can involve writing chunks to a protected storage layer. An implementation of the present techniques can:

Facilitate doing a chunk write with minimal changes to a prior chunk store;

Minimize MD updates (file mapping structures, leaf, and virtual chunk pointers);

Provide satisfactory performance for a storage system, leveraging PMEM;

Be resilient to a two-node failure;

Reduce write amplification to a solid state drive (SSD), is used;

Reduce a number of I/Os to backend to be hard disk drive (HDD) friendly; and

Provide a fast recovery.

Example Architectures, Etc.

FIG. 1 illustrates an example system architecture 100 that can facilitate delayed log write of IOs using PMEM, in accordance with an embodiment of this disclosure.

System architecture 100 comprises computer storage system 102, communications network 104, and remote computer 106. In turn, computer storage system 102 comprises delayed log write of IOs using PMEM component 108, and data storage 110.

System architecture 100 presents one logical example of implementing the present techniques, and it can be appreciated that there can be other example architectures.

Figure 14:
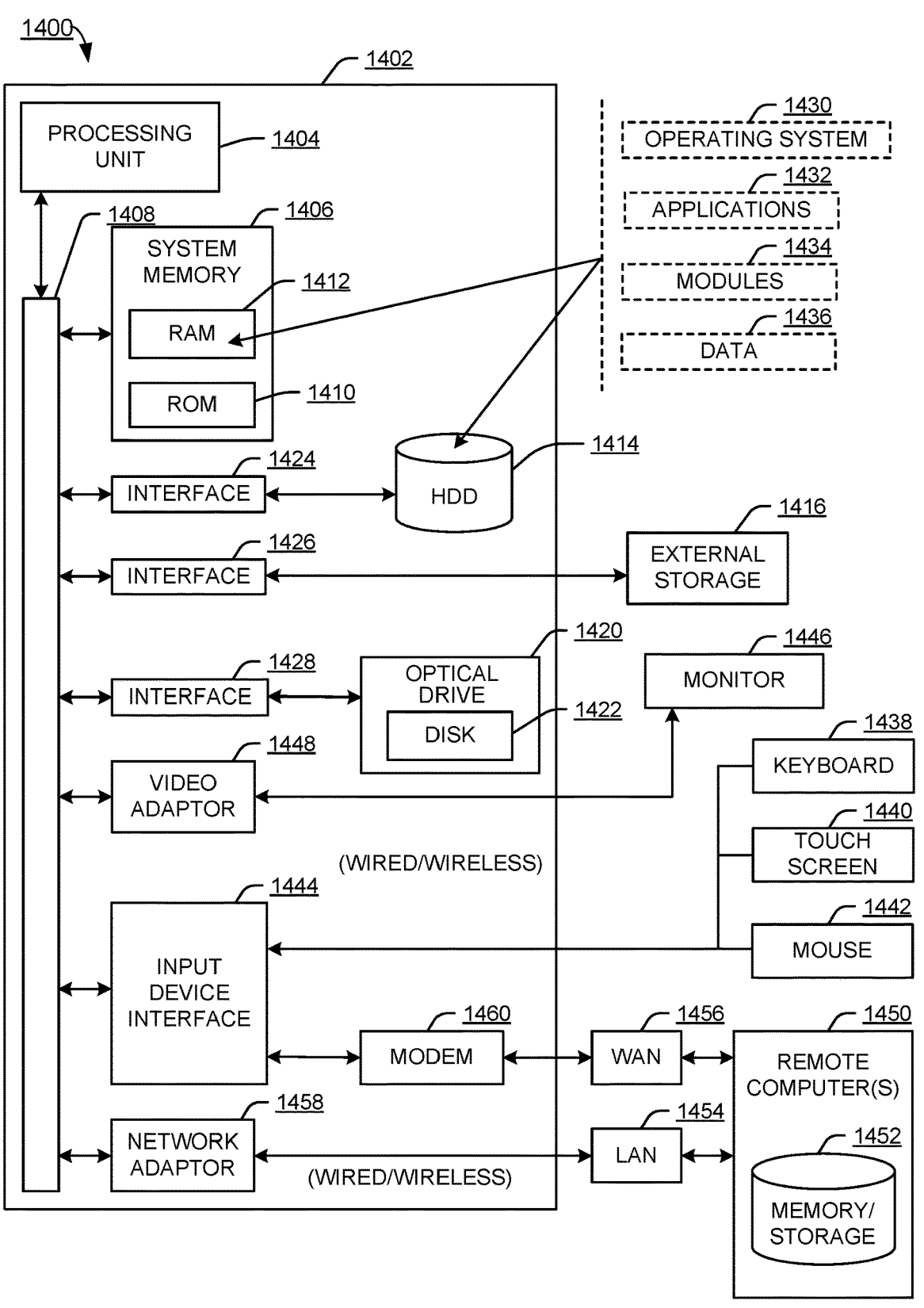
FIG. 14 illustrates an example block diagram of a computer operable to execute an embodiment of this disclosure.

Each of computer storage system 102 and/or remote computer 106 can be implemented with part(s) of computing environment 1400 of FIG. 14. Communications network 104 can comprise a computer communications network, such as the Internet, or an intranet.

In some examples, a delayed log write of IOs using PMEM component 108 can facilitate delayed log write of IOs using PMEM on data storage 110.

Figure 3:
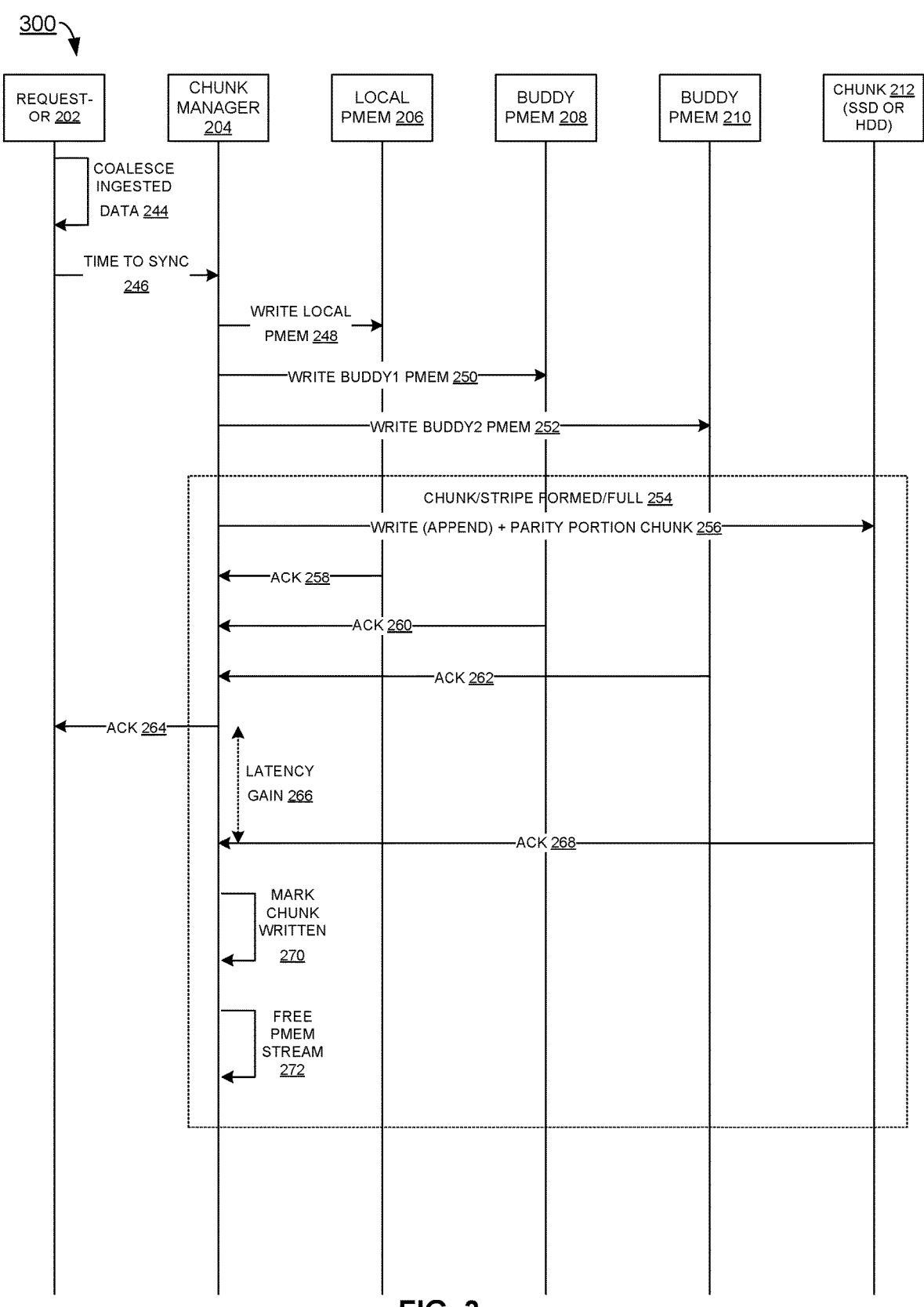
FIG. 3 illustrates another example signal flow of delaying log writes until a stripe or chunk is completely formed, and that can facilitate delayed log write of IOs using PMEM, in accordance with an embodiment of this disclosure.
Figure 4:
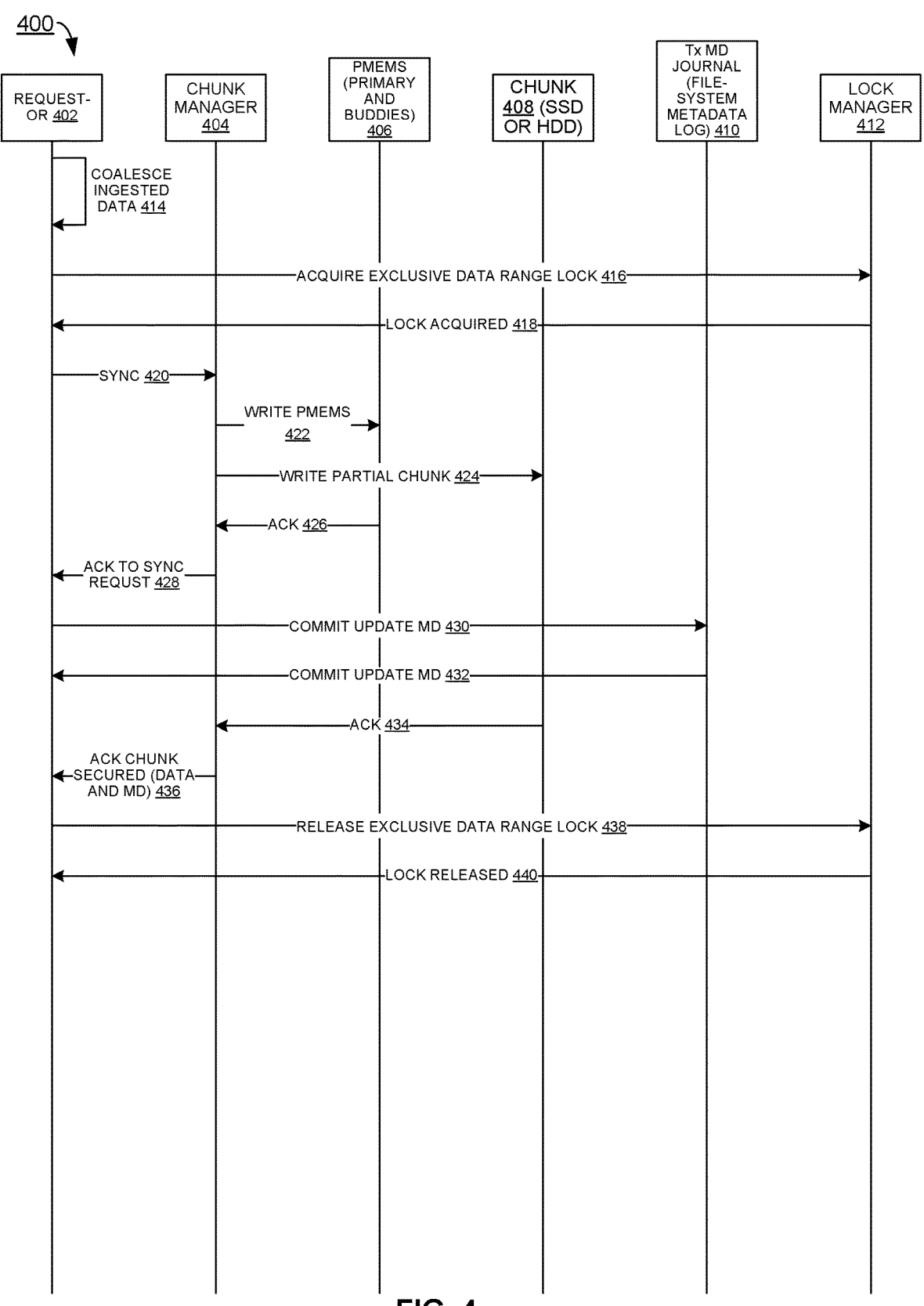
FIG. 4 illustrates an example signal flow for locking and metadata (MD) flow, and that can facilitate delayed log write of IOs using PMEM, in accordance with an embodiment of this disclosure.

In some examples, a delayed log write of IOs using PMEM component 108 can implement part(s) of the signal flows of FIGS. 2-4 and/or 10, and/or the process flows of FIGS. 9 and/or 11-13 to implement delayed log write of IOs using PMEM.

It can be appreciated that system architecture 100 is one example system architecture for delayed log write of IOs using PMEM, and that there can be other system architectures that facilitate delayed log write of IOs using PMEM.

FIG. 2 illustrates an example signal flow 200 of delaying log writes until a stripe or chunk is completely formed, to achieve a latency gain, and that can facilitate delayed log write of IOs using PMEM, in accordance with an embodiment of this disclosure. In some examples, part(s) of signal flow 200 can be used by part(s) of system architecture 100 of FIG. 1 to facilitate delayed log write of IOs using PMEM.

FIG. 3 illustrates another example signal flow 300 of delaying log writes until a stripe or chunk is completely formed, and that can facilitate delayed log write of IOs using PMEM, in accordance with an embodiment of this disclosure. In some examples, part(s) of signal flow 300 can be used by part(s) of system architecture 100 of FIG. 1 to facilitate delayed log write of IOs using PMEM.

FIG. 2 can illustrate an example of a latency gain in writing data to PMEM in parallel to the storage holding the Chunk. It can also illustrate that the chunk (or log write) can be made partially to the storage. FIG. 3 can illustrate how, once the chunk is fully formed, how the parity is written and the PMEM space used to store the entire Chunk is "freed."

In some examples, the signal flow of FIGS. 2-3 can be implemented sequentially (that is, the signal flow of signal flow 200, then the signal flow of signal flow 300).

Signal flow 200 of FIG. 2 and signal flow 300 of FIG. 3 comprise requestor 202, chunk manager 204, local PMEM 206, buddy PMEM 208, buddy PMEM 210, and chunk 212 (SSD or HDD).

Aspects depicted in signal flow 200 and signal flow 300 are:

Coalesce ingested data 214;

Time to sync 216;

Allocate PMEM stream 218;

Allocate chunk 220;

Write local PMEM 222;

Write Buddy1 PMEM 224;

Write Buddy2 PMEM 226;

Chunk/stripe not filled 228;

Write (append) portion chunk 230;

Ack from PMEM 206 232;

Ack from PMEM Buddy1 208 234;

Ack from PMEM Buddy2 210 236;

Ack to requestor 202 238 (with latency gain 240);

Ack from SSD/HDD 242;

Coalesce ingested data 244;

Time to sync 246;

Write local PMEM 248;

Write Buddy1 PMEM 250;

Write Buddy2 PMEM 252;

Chunk/stripe formed/full 254;

Write (append)+parity portion chunk 256;

Ack 258;

Ack 260;

Ack 262;

Ack 264;

Latency gain 266;

Ack 268;

Mark chunk written 270;

Free PMEM stream 272.

The present techniques can be implemented to write (sync) data, after a data reduction phase of ingest, sequentially to form (over time) a complete stripe to parity protected storage (or, a chunk store). Since it can be that the parity cannot be determined until an entire stripe is received (in this case written), the data can be mirrored to PMEM while filling a stripe. Once the stripe/chunk is completely formed, the parity(s) can be written and the PMEM mirror copies can be freed. A log write (or stripe write) can be delayed until completely formed.

The present techniques can leverage PMEM to secure the data until the stripe is protected by parity, and to minimize latency. It can be that writes to PMEM are faster than those to an SSD or an HDD (which can be the media hosting the stripe or chunk), so once secured to PMEM, writes can be acknowledged regardless of a state of the write to the stripe/chunk.

Once a stream has been filled, it can be that it is freed and re-used for new writes after a chunk synchronization phase. In some examples, the chunk synchronization phase can comprise:

Waiting for chunk asynchronous writes to be completed;

Computing a parity of the chunk; and

Writing the parity of the chunk (in some examples this can be done along a last data write).

FIG. 4 illustrates an example signal flow 400 for locking and MD flow, and that can facilitate delayed log write of IOs using PMEM, in accordance with an embodiment of this disclosure. In some examples, part(s) of signal flow 400 can be used by part(s) of system architecture 100 of FIG. 1 to facilitate delayed log write of IOs using PMEM.

The present techniques can be implemented to minimize (or reduce) MD updates. It can be that file structures (e.g., file mapping structures, tree leaf and virtual chunk pointers) are not mapped at write time to a PMEM location, but are mapped directly to the final destination: the stripe/chunk. This can mean that that files are only read from chunks (in a normal case; this can be different in a crash cash). However, since chunks might not be secured on media (e.g., SSD or HDD) at a time of read, a mechanic can synchronize the two operations. This can be done by leveraging a file data range lock. A file data range lock can be held exclusively during a chunk partial write. So, any read, which can need a read data range lock, can then be synchronized behind the chunk partial write.

Signal flow 400 comprises requestor 402, chunk manager 404, PMEMs (primary and buddies) 406, chunk 408 (SSD or HDD), Tx MD journal (filesystem metadata log) 410, and lock manager 412.

Metadata can generally be used to organize a file system, and can be distinguished from data (or user data), that a user account wants stored on the file system. A metadata transaction journal can generally comprise a journal that stores updates to metadata in a transactional manner such that updates that modify multiple disjunct pieces of metadata can be executed in an atomic fashion (that is, either all updates happen, or no updates happen).

In some systems, a chunk can be stored on multiple devices, and can have with parity data on some devices. One piece on one device can be referred to as a chunklet.

Signals depicted in signal flow 400 are:

Coalesce ingested data 414;

Acquire exclusive data range lock 416;

Lock acquired 418;

Sync 420;

Write PMEMs 422;

Write partial chunk 424;

Ack 426 from PMEMs 406;

Ack to sync request 428;

Commit update MD 430;

Ack of commit update MD 432;

ACK 434 from SSD/HDD 408;

ACK chunk secured (data and MD) 436;

Release exclusive data range lock 438;

Lock released 440.

FIG. 5 illustrates an example system architecture 500 of a chunk being filled when IO to the chunk is delayed, and that can facilitate delayed log write of IOs using PMEM, in accordance with an embodiment of this disclosure. In some examples, part(s) of system architecture 500 can be used by part(s) of system architecture 100 of FIG. 1 to facilitate delayed log write of IOs using PMEM.

Writes to a stripe portion can be delayed until at least one or more complete chunklet (e.g., a portion of a chunk that is stored on a single drive; for example with a 2 MB chunk using 4 drives, a chunklet can be 512 KB) of a drive hosting the chunk portion is/are filled. This can reduce SSD wear, and/or the number of IOs to a backend, eliminating a race condition (e.g., two writes to the chunk on the same block simultaneously), and offer an opportunity to aggregate writes to the same files.

FIG. 5 can illustrate a way that a chunk can be filled, and when IO to a chunk is delayed.

System architecture 500 comprises chunk/stripe 502, write issued to drive 504, delayed write 506, current filled pointer 508, 4+p RAID 510, chunklet size 512, and delayed log write of IOs using PMEM component 514 (which can be similar to delayed log write of IOs using PMEM component 108 of FIG. 1).

Figure 6:
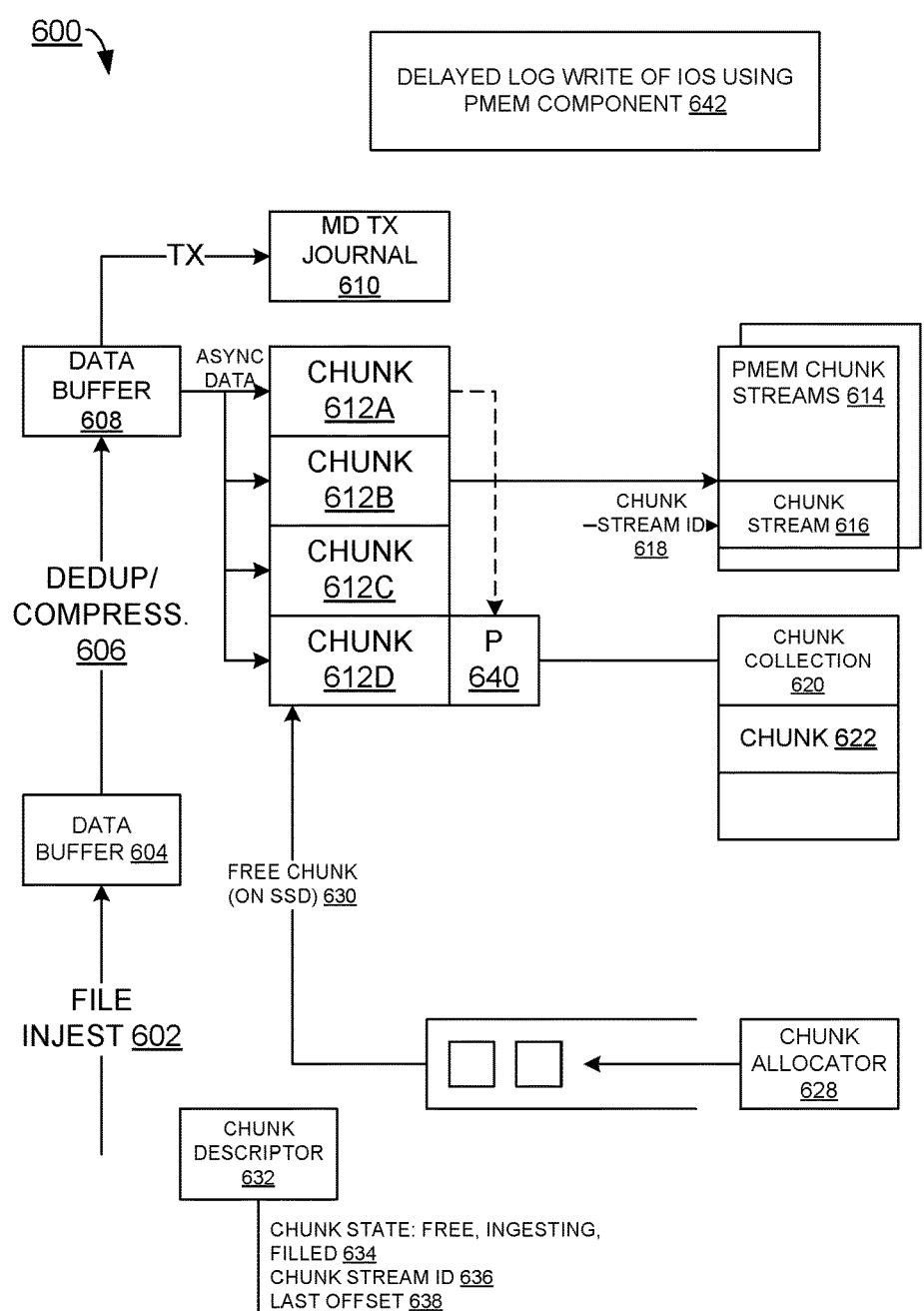
FIG. 6 illustrates an example system architecture that can facilitate delayed log write of IOs using PMEM, in accordance with an embodiment of this disclosure.

FIG. 6 illustrates an example system architecture 600 that can facilitate delayed log write of IOs using PMEM, in accordance with an embodiment of this disclosure. In some examples, part(s) of system architecture 600 can be used by part(s) of system architecture 100 of FIG. 1 to facilitate delayed log write of IOs using PMEM.

It can be preferable to choose PMEM buddy locations to be identical to those of MD journal buddies (if any exist), since both can be sharing the same PMEM and for recovery purposes, the MD Tx can replay modification to some structures managing the streams.

Also, it can be that two PMEM copies can be enough to reach a five 9's for a service level agreement (SLA; where five 9's is 99.999% uptime), since a probability of losing a second PMEM (or node) until a chunk write is completed and/or PMEM repair is performed can be low.

System architecture 600 comprises file ingest 602, data buffer 604, deduplication/compression 606, data buffer 608, metadata transactional journal (MD Tx journal) 610 (e.g., a file system journal), chunk 612A, chunk 612B, chunk 612C, chunk 612D, PMEM chunk steams 614, chunk stream 616, chunk stream ID 618, chunk collection 620 (which can comprise a set of slices of drives (each slice on a different drive) hosting a set of chunks, and in some examples can be grouped for optimal layout), chunk 622, chunk allocator 628, free chunk (on SSD) 630, chunk descriptor 632, chunk state (free, ingesting, filled) 634, chunk stream ID 636, last offset 638, parity (P) 640, and delayed log write of IOs using PMEM component 642 (which can be similar to delayed log write of IOs using PMEM component 108 of FIG. 1).

FIG. 7 illustrates an example system architecture 700 of a symmetrical partition format, and that can facilitate delayed log write of IOs using PMEM, in accordance with an embodiment of this disclosure. In some examples, part(s) of system architecture 700 can be used by part(s) of system architecture 100 of FIG. 1 to facilitate delayed log write of IOs using PMEM.

In some examples, chunk streams can be allocated and/or freed on a dedicated address space on PMEM that can be referred to as PMEM stream space. It can be triple mirrored, with one local copy, and two copies on buddy nodes.

The PMEM Stream space can be partitioned into three areas: one Local, Buddy 1, and Buddy 2. Each partition can have symmetrical format.

System architecture 700 comprises media stream-0 descriptor 702A, media stream-1 descriptor 702B, media stream-2 descriptor 702C, media stream-3 descriptor 702D, media stream-N descriptor 702N, chunk stream-0 704A, chunk stream-1 704B, chunk stream-N 704N, media stream descriptor 706, stream state (free—ingesting) 708, chunk ID associated 710, last offset 712, and delayed log write of IOs using PMEM component 714 (which can be similar to delayed log write of IOs using PMEM component 108 of FIG. 1).

A media stream descriptor can track a state of a stream in the partition. In some examples, the state can be free or ingesting when data is actively being appended. The local node can allocate a chunk stream on its "local" or "own" partition. Implicitly, the same chunk stream can be allocated on its buddy 1 and buddy 2 partitions, which can be located on two different nodes.

Streams can be assigned to a logical inode (LIN, which can be a data structure that describes a file system object) based on different criteria, for example:

Stream space availability;

Stream least recently used (LRU);

LIN write history (e.g., a LIN that was recently written can be segregated into a separate stream); and LIN type (e.g., jpeg files can use a dedicated stream).

Once a stream is assigned to a LIN, successive writes/syncs can use the same stream until that stream is full. Multiple LINs can use the same stream.

Figure 8:
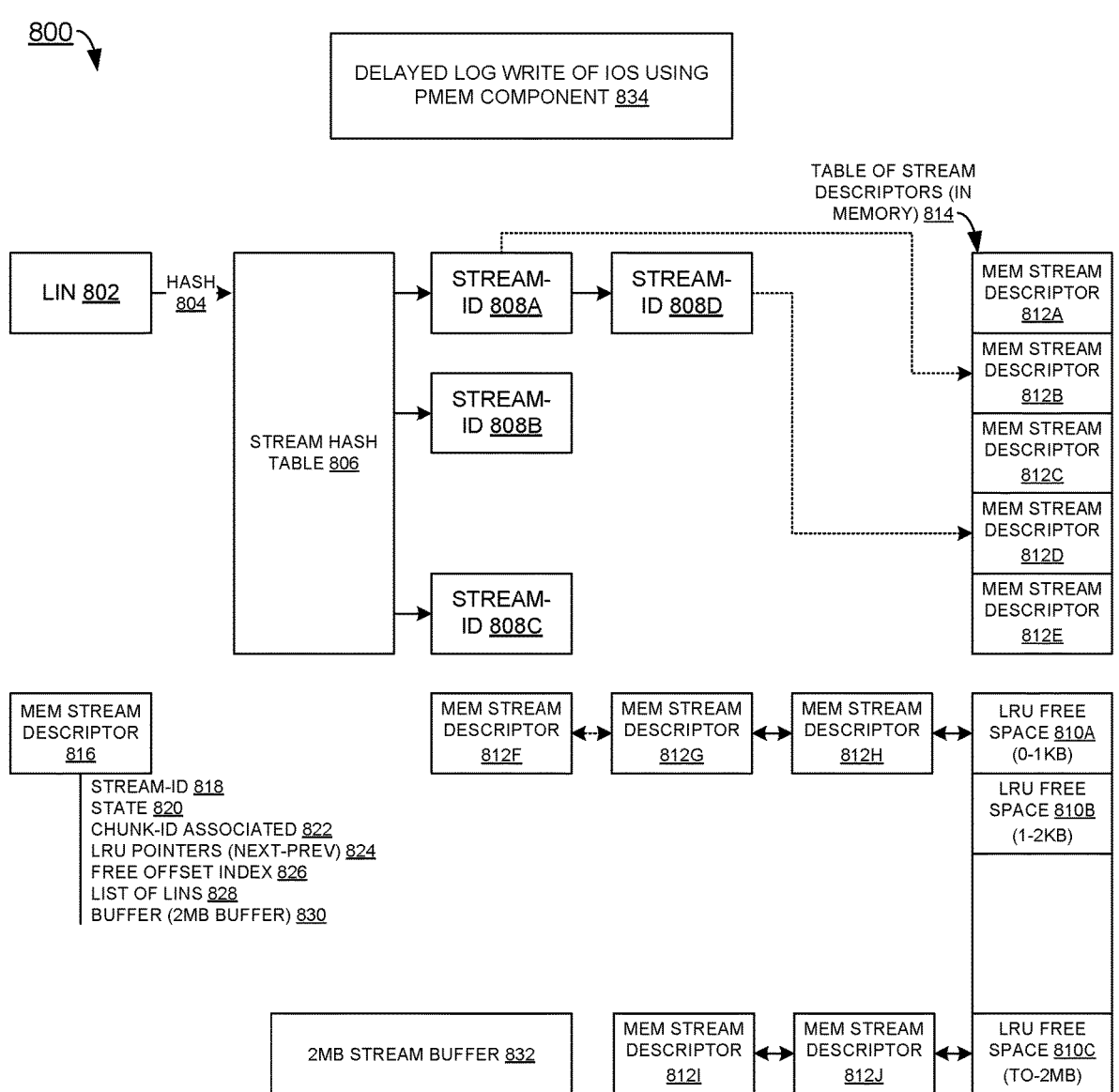
FIG. 8 illustrates an example system architecture for managing a stream, and that can facilitate delayed log write of IOs using PMEM, in accordance with an embodiment of this disclosure.

FIG. 8 illustrates an example system architecture 800 for managing a stream, and that can facilitate delayed log write of IOs using PMEM, in accordance with an embodiment of this disclosure. In some examples, part(s) of system architecture 800 can be used by part(s) of system architecture 100 of FIG. 1 to facilitate delayed log write of IOs using PMEM.

System architecture 800 comprises logical inode (LIN) 802, hash 804, stream hash T 806, stream-ID 808A, stream-ID 808B, stream-ID 808C, stream-ID 808D, least-recently used (LRU) free space range 810A (0-1 kilobytes (KB)), LRU free space range 810B (1 KB-2 KB), LRU free space range 810C (to 2 megabytes (MB)), media stream descriptor 812A, media stream descriptor 812B, media stream descriptor 812C, media stream descriptor 812D, media stream descriptor 812E, media stream descriptor 812F, media stream descriptor 812G, media stream descriptor 812H, media stream descriptor 812I, media stream descriptor 812J, table of stream descriptors 814 (in memory), mem stream descriptor 816, stream-ID 818, state 820, chunk-ID associated 822, LRU pointers (next-previous) 824, free offset index 826, list of LINs 828, buffer 830 (2 MB buffer), 2 MB stream buffer 832, and delayed log write of IOs using PMEM component 834 (which can be similar to delayed log write of IOs using PMEM component 108 of FIG. 1).

In some examples, LIN hints can be used to decide to attach LIN 802 to a new or existing stream (e.g., a .jpeg file).

On data sync/write, a LIN can be hashed. A stream hash table entry for that hash can point to a list of "mem stream descriptors identifiers (IDs)." This ID can refer to an index in the table of mem stream descriptors stored in memory. The size of the table can be set according to the number of local streams per node. There can be a stream hash table per node ingesting data.

Where a mem stream descriptor is tracking the LIN being synced, then the stream can be used, and the data can be appended to the stream and the chunk. This can occur where remaining free space permits, and otherwise another stream can be assigned to the LIN (where, in this case, the LIN can be removed from old stream descriptors).

In some examples, PMEM can be a block device, with a 512 byte (B) sector size (and it can be appreciated that the present techniques can be implemented with other types of devices that can have other sector sizes). A protected storage hosting a chunk can also be a block device with a 512 B sector size. This can mean that writes to PMEM and to chunks are aligned at 512 B. It can be a responsibility of an ingest process (or coalescer) to make a read/merge of any unaligned file system (FS) 8 kilobyte (KB) data block before compressing and/or deduping and syncing to stream and chunk. IOs to PMEM streams and to chunks can be 512 B aligned. Overlap write can be performed at the end of a last 512 B. in some examples, either a small buffer of the last 512 B, or an entire 2 megabyte (MB) buffer are kept per stream. In some examples, a 2 MB buffer can be kept to eventually compute a parity of the chunk.

It can be that, if no stream descriptor is assigned to a LIN, then a new one stream can be assigned using the table that tracks the stream with free space per range. That table can be local to a node and can comprise LRU pointers to mem stream descriptors of the same range of free space (e.g., 1-2 KB . . . ). The least used entry can be selected, or, where the LIN hint suggests that a new stream should be assigned (e.g., type="jpg" file), then a new stream can be assigned (free streams can be in the last entry in the table—media stream descriptor 812I and media stream descriptor 812J). It can be that the content of stream does not act as a write cache; rather, it can act as a coalescer of chunks. At a time of partial chunk writes, the data blocks can be mapped to the chunk.

FIG. 9 illustrates an example process flow 900 for data buffer signal flow, and that can facilitate delayed log write of IOs using PMEM, in accordance with an embodiment of this disclosure. In some examples, one or more embodiments of process flow 900 can be implemented by delayed log write of IOs using PMEM component 108 of FIG. 1, or computing environment 1400 of FIG. 14.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 1100 of FIG. 11, process flow 1200 of FIG. 12, and/or process flow 1300 of FIG. 13.

A mem stream descriptor can describe pertinent information about the stream: e.g., a list of LINs assigned to this Stream, the chunk ID linked to this stream, the 2 MB buffer used for filling the stream, and LRU pointers and the next byte offset available in the stream.

Process flow 900 comprises sync request queue 902, data sync request 904, LIN attached to a stream? 906, assign chunk stream 908, new stream assigned? 910, pre-allocate chunk (in memory) 912, pre-allocate virtual chunk pointers 914, fill stream and chunk 916, chunk full? 918, finish write chunk (with parity) 920, sync point 922 (which can be a point of waiting for a. chunk to be written to a SSD/HDD so the stream can be freed), Tx: chunk-id filled/virtual: ingest extent/stream-ID: free/leaf update/inode update 924, write stream ×3 926 (512 bit aligned), Tx: chunk-ID ingesting/stream-ID extend ingested/virtual: extent ingested/leaf update/inode update 928, and end 930.

Once a chunk is full and secure on media, the stream can be freed, and can be re-used for other data buffer sync operations. Stream hash table entries can be removed, as well, for LINs involved in the chunk.

In examples where chunks are partially written, a chunk store application programming interface (API) can support writing to a chunk of less than 2 MB (and in some examples, at least 512 B aligned) and without writing the parity.

The parity can be evaluated once the chunk is full. In this case, the layer above chunk store can keep a 2 MB buffer (as mentioned previously), and the last write to the Chunk shall determine a parity of the chunk, and add that parity to the chunk.

Figure 10:
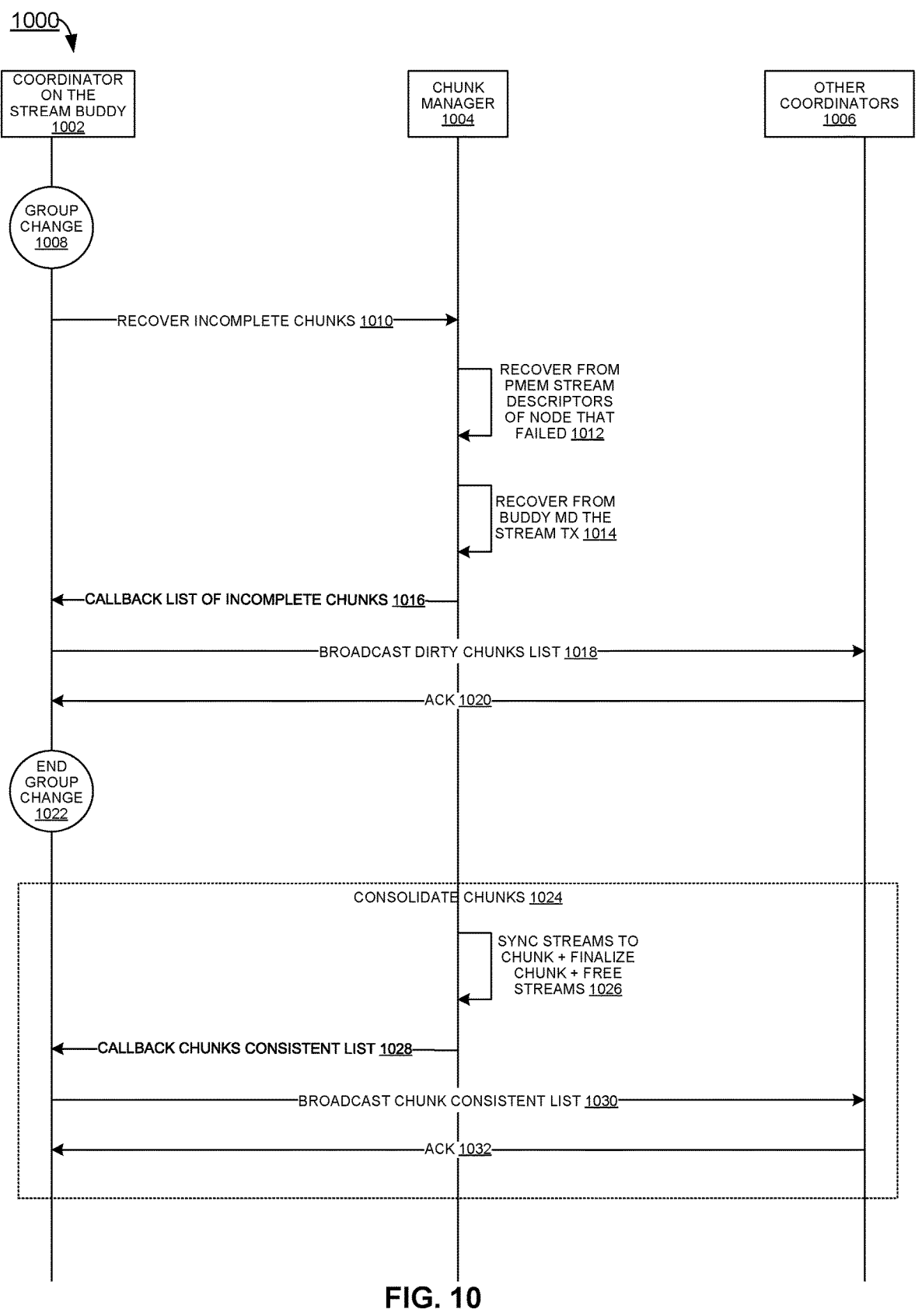
FIG. 10 illustrates an example signal flow for data recovery, and that can facilitate delayed log write of IOs using PMEM, in accordance with an embodiment of this disclosure.

FIG. 10 illustrates an example signal flow 1000 for data recovery, and that can facilitate delayed log write of IOs using PMEM, in accordance with an embodiment of this disclosure. In some examples, part(s) of signal flow 1000 can be used by part(s) of system architecture 100 of FIG. 1 to facilitate delayed log write of IOs using PMEM.

The phases can be described by signal flow 1000, which can be simplified to focus on pertinent operations of a group change.

Signal flow 1000 comprises coordinator on the stream buddy 1002, chunk manager 1004, and other coordinators 1006.

Signals of signal flow 1000 are:

Group change 1008;

Recover incomplete chunks 1010;

Recover from PMEM stream descriptors of node that failed 1012;

Recover from Buddy MD the stream Tx 1014;

CallBack list of incomplete chunks 1016;

Broadcast dirty chunks list 1018;

Ack 1020;

End group change 1022;

Consolidate chunks 1024;

Sync streams to chunk+finalize chunk+free streams 1026;

Callback chunks consistent list 1028;

Broadcast chunk consistent list 1030;

Ack 1032.

During a consolidation phase of dirty chunks of a node that failed, reads to those chunks can be impacted (where a file mapping structure points to a chunk rather than to PMEM). It can be that reads cannot processed until chunks are known to be consistent (or finalized). To reduce the number of impacted reads, an optimization can be, as streams are filled and their descriptor are updated in MD Tx, that the Tx records are updated as well as the "consistent offset in chunk." When the list of dirty chunks is broadcast to cluster coordinators, during a group change, a last consistent offset of dirty chunks can be provided. This can mean that only reads to a dirty chunk past the last consistent offset are delayed.

If during the recovery, the node that failed comes back up, its dirty chunks can be in quarantine until dirty chunks are consolidated. The node can resume writing using streams available. The list of streams/chunks in a quarantine state can be determined when the node is joining the quorum. That is, the list of current dirty chunks can be provided by the buddy executing the recovery.

Example Process Flows

FIG. 11 illustrates an example process flow 1100 that can facilitate delayed log write of IOs using PMEM, in accordance with an embodiment of this disclosure. In some examples, one or more embodiments of process flow 1100 can be implemented by delayed log write of IOs using PMEM component 108 of FIG. 1, or computing environment 1400 of FIG. 14.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 900 of FIG. 9, process flow 1200 of FIG. 12, and/or process flow 1300 of FIG. 13.

Process flow 1100 begins with 1102, and moves to operation 1104.

Operation 1104 depicts maintaining a data storage system, wherein the data storage system comprises persistent memory and chunk storage, wherein the persistent memory is more performant than the chunk storage, wherein chunk storage stores data in chunks of a fixed-size, and wherein respective chunks of the chunks correspond to respective parity values. That is, a data storage system can comprise both PMEM and chunk storage.

In some examples, the persistent memory comprises a first persistent memory and a second persistent memory, and wherein the first persistent memory and the second persistent memory are managed by a chunk store as a chunk domain. That is, PMEM mirrors can be managed by a chunkstore as a specific chunk domain.

That is, it can be that, instead of a file system managing individual PMEMs, there can be an intermediator (e.g., the chunk domain) that provides an abstraction layer. The file system can see a chunk domain to which it can write. The chunk domain can be responsible for sending the write to multiple persistent memory devices and acknowledge the write once enough redundancy has been achieved.

After operation 1104, process flow 1100 moves to operation 1106.

Operation 1106 depicts, based on receiving a request associated with a user account to write data to the data storage system, writing the data to the persistent memory concurrently with writing the data to the chunk storage. That is, data can be written to both PMEM and chunk storage at the same time.

In some examples, operation 1106 comprises updating a file mapping structure and a virtual chunk pointer while writing the data to the chunk storage. In some examples, this comprises omitting updating a file mapping structure page or an inode during a chunk synchronization phase based on updating the MD leaf and the virtual chunk pointer. That is, as writes to streams and chunks occur, file mapping structures and virtual chunk pointers can be updated, leveraging a Tx MD Journal.

In some examples, updating the file mapping structure and the virtual chunk pointer comprises writing the file mapping structure and the virtual chunk pointer to the chunk storage, and omitting mapping the file mapping structure and the virtual chunk pointer to the persistent memory. That is, metadata updates can be minimized where file structures are not mapped at write time to a PMEM location, but directly to a final destination of a stripe/chunk.

In some examples, a file points to a collection of data blocks via a btree metadata structure (with a key of a logical block number, and a value of an address pointing to the actual block). There can be another level of indirection, where a virtual address can be stored in the btree's value and that virtual address then points to a "physical" location inside a chunk.

The address that the file btree points to can be updated when new data is written, and that can either be done inline, or asynchronously.

After operation 1106, process flow 1100 moves to operation 1108.

Operation 1108 depicts, after completing writing the data to the persistent memory and before completing writing the data to the chunk storage, sending an indication, via the user account, that the data has been successfully stored in the data storage system. That is, success of the write can be acknowledged back to the requestor when writing to PMEM has completed, but chunk storage is still being written to, and this can reduce latency from the view of the requestor.

In some examples, the persistent memory comprises a first persistent memory and a second persistent memory, and wherein writing the data to the persistent memory comprises writing the data to the first persistent memory and writing the data to the second persistent memory. In some examples, sending the indication to the storage client that the data has been successfully stored in the data storage system is based on completing writing the data to the first persistent memory or completing writing the data to the second persistent memory. That is, there can be multiple PMEMs (e.g., local PMEM and buddy PMEM) and an ack for writing the data can be sent after writing it to any of the PMEMs.

In some examples operation 1108 comprises allocating a persistent memory stream for the data, wherein writing the data to the persistent memory comprises writing the data to the persistent memory stream; after filling a chunk of the chunk storage, storing a parity value of the respective parity values that corresponds to the chunk; after storing the parity value, marking the chunk as written; and after marking the chunk as written, freeing the persistent memory stream. That is, PMEM streams can be created and freed.

After operation 1108, process flow 1100 moves to 1110, where process flow 1100 ends.

FIG. 12 illustrates an example process flow 1200 that can facilitate delayed log write of IOs using PMEM, in accordance with an embodiment of this disclosure. In some examples, one or more embodiments of process flow 1200 can be implemented by delayed log write of IOs using PMEM component 108 of FIG. 1, or computing environment 1400 of FIG. 14.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 900 of FIG. 9, process flow 1100 of FIG. 11, and/or process flow 1300 of FIG. 13.

Process flow 1200 begins with 1202, and moves to operation 1204.

Operation 1204 depicts maintaining a data storage system, wherein the data storage system comprises persistent memory and chunk storage, wherein the persistent memory is more performant than the chunk storage, wherein the chunk storage stores data in chunks of a fixed-size, and wherein respective chunks of the chunks correspond to respective parity values. In some examples, operation 1204 can be implemented in a similar manner as operation 1104 of FIG. 11.

After operation 1204, process flow 1200 moves to operation 1206.

Operation 1206 depicts, based on receiving a request to write data to the data storage system, writing the data to the persistent memory concurrently with writing the data to the chunk storage. In some examples, operation 1206 can be implemented in a similar manner as operation 1106 of FIG. 11.

In some examples, operation 1206 comprises delaying writing a write to a stripe of the chunk storage until one drive or fault domain's contribution to a chunk is filled. That is, writes to a stripe portion can be delayed until at least one complete chunklet of a drive that hosts a corresponding chunk portion is/are filled.

It can be that, to minimize writes, it can be preferred not to write to the same region of a disk multiple times. For SSDs, this can be for endurance; for HDDs, this can be for speed. Where the chunklet is a single drive's contribution to a chunk, incoming writes can potentially be written right away to the PMEM, while the writes to the HDD/SSD can be batched up until the full data to write to that HDD/SSD for a given chunk is known, and then that write can be issued to the HDD/SSD as one I/O.

In some examples, writing the data to the chunk storage comprises writing the data to a chunk of the chunk storage, the chunk is associated with a chunk identifier, and writing the data to the persistent memory comprises writing the data to a portion of the persistent memory that is associated with the chunk identifier. That is, a PMEM chunk stream can store a chunk stream that has a chunk stream ID. In some examples, multiple chunk streams can map to a single chunk In some examples, writing the data to the persistent memory comprises associating a persistent memory stream with a logical inode of the persistent memory, wherein the persistent memory stream has a fixed size, and utilizing the logical inode for successive data writes until the persistent memory stream is filled. That is, it can be that, once a stream is assigned to a LIN, successive writes/syncs can use the same stream until the stream is full.

After operation 1206, process flow 1200 moves to operation 1208.

Operation 1208 depicts, after completing writing the data to the persistent memory and before completing writing the data to the chunk storage, sending an acknowledgment that the data has been successfully stored in the data storage system to an entity associated with the request. In some examples, operation 1208 can be implemented in a similar manner as operation 1108 of FIG. 11.

In some examples, operation 1208 comprises acquiring an exclusive data range lock on a portion of a chunk of the chunk storage that corresponds to writing the data to the chunk storage (prior to operation 1208), and releasing the exclusive data range lock after writing the data to the chunk storage. In some examples where the request is a first request, operation 1208 comprises, based on receiving a second request to read from the portion of the chunk while writing the data to the chunk storage, processing the request to read from the portion of the chunk after completing writing the data to the chunk storage. That is, where chunks are not secured on media at a time of read, there can be a mechanism to synchronize reads and writes. This mechanic can involve a file data range lock.

After operation 1208, process flow 1200 moves to 1210, where process flow 1200 ends.

FIG. 13 illustrates an example process flow 1300 that can facilitate delayed log write of IOs using PMEM, in accordance with an embodiment of this disclosure. In some examples, one or more embodiments of process flow 1300 can be implemented by delayed log write of IOs using PMEM component 108 of FIG. 1, or computing environment 1400 of FIG. 14.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 900 of FIG. 9, process flow 1100 of FIG. 11, and/or process flow 1300 of FIG. 13.

Process flow 1300 begins with 1302, and moves to operation 1304.

Operation 1304 depicts, based on receiving a request to write data to a data storage system that comprises a persistent memory and a chunk storage, writing the data to the persistent memory in parallel with writing the data to the chunk storage. In some examples, operation 1304 can be implemented in a similar manner as operations 1104-1106 of FIG. 11.

In some examples, the persistent memory has a first sector size, the chunk storage has a second sector size, and operation 1304 comprises aligning writes to the persistent memory and the chunk storage based on the first sector size and the second sector size. That is, PMEM can have a 512 B sector size, so writes to PMEM and chunks can be aligned at 512 B.

In some examples, writing the data to the chunk storage comprises writing the data to a first sub-portion of a chunk of the chunk storage, wherein a second sub-portion of the chunk is empty after completing writing the data to the first sub-portion, and creating parity information for the chunk after filling the chunk. That is, in examples where chunks are partially written, a chunk store API) can support writing to a chunk of less than 2 MB (and in some examples, at least 512 B aligned) and without writing the parity.

After operation 1304, process flow 1300 moves to operation 1306.

Operation 1306 depicts, after completing writing the data to the persistent memory and before completing writing the data to the chunk storage, sending an acknowledgment that the data has been successfully stored in the data storage system to an entity associated with the request. In some examples, operation 1306 can be implemented in a similar manner as operation 1108 of FIG. 11.

In some examples, the persistent memory comprises a logical inode, and operation 1306 comprises, based on synchronizing or writing to the logical inode, hashing the logical inode to produce a hash, and storing a stream hash table entry for the hash that identifies a group of memory stream descriptor identifiers, where respective memory stream descriptor identifiers of the group of memory stream descriptor identifiers. That is, on data sync/write, a LIN can be hashed. A stream hash table entry for that hash can point to a list of "mem stream descriptors identifiers (IDs)." This ID can refer to an index in the table of mem stream descriptors stored in memory. The size of the table can be set according to the number of local streams per node. There can be a stream hash table per node ingesting data.

A hash-table can be used to map a given inode to a given stream, without having to modify the inode. This can provide a way to (at least partly) aggregate incoming writes to the same file, so that they end up in the same chunks. This can help performance and maintenance in several ways, such as that, if/when that file is eventually deleted and those blocks become free, the now-freed blocks can be affined to a smaller number of chunks, so there are fewer chunks that can need to be garbage-collected (that is, have their storage space reclaimed for storing other data).

In some examples, writing the data to the chunk storage comprises writing the data to a chunk of the chunk storage, and operation 1306 comprises, after completing writing the chunk, freeing a memory stream descriptor identifier that corresponds to the chunk, and removing the stream hash table entry that corresponds to the chunk from a stream hash table that comprises the stream hash table entry. That is, once a chunk is full and secure on media, the stream can be freed, and can be re-used for other data buffer sync operations. Stream hash table entries can be removed, as well, for LINs involved in the chunk.

In some examples, performing data recovery for a node of the data storage system comprises reading steam descriptors from the persistent memory that are associated with the node; rebuilding a table of stream descriptors based on the stream descriptors, wherein the table of stream descriptors is stored in computer memory; modifying stream descriptors in the table of stream descriptors based on replaying a journal associated with the node, to produce a modified table of stream descriptors; for respective stream descriptors in the modified table of stream descriptors that are associated with an ingesting state, marking respective associated chunks as finalized; marking the respective stream descriptors as free; and synchronizing the respective stream descriptors to the persistent memory.

After operation 1306, process flow 1300 moves to 1308, where process flow 1300 ends.

Example Operating Environment

In order to provide additional context for various embodiments described herein, FIG. 14 and the following discussion are intended to provide a brief, general description of a suitable computing environment 1400 in which the various embodiments of the embodiment described herein can be implemented.

For example, parts of computing environment 1400 can be used to implement one or more embodiments of computer storage system 102 and/or remote computer 106.

In some examples, computing environment 1400 can implement one or more embodiments of the signal flows of FIGS. 2-4 and/or 10, and/or the process flows of FIGS. 9 and/or 11-13 to facilitate delayed log write of IOs using PMEM.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile storage such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples, and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, commu-nications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/ communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

maintaining a data storage system, wherein the data storage system comprises persistent memory and chunk storage, wherein the persistent memory is more performant than the chunk storage, wherein the chunk storage stores data in chunks of a fixed-size, and wherein respective chunks of the chunks correspond to respective parity values;

based on receiving a request associated with a storage client to write data to the data storage system, writing the data to the persistent memory concurrently with writing the data to the chunk storage;

allocating a persistent memory stream for the data, wherein writing the data to the persistent memory comprises writing the data to the persistent memory stream;

after completing writing the data to the persistent memory and before completing writing the data to the chunk storage, sending an indication, to the storage client, that the data has been successfully stored in the data storage system;

after filling a chunk of the chunk storage, storing a parity value of the respective parity values that corresponds to the chunk;

after storing the parity value, marking the chunk as written; and after marking the chunk as written, freeing the persistent memory stream.

2. The system of claim 1, wherein the persistent memory comprises a first persistent memory and a second persistent memory, and wherein writing the data to the persistent memory comprises writing the data to the first persistent memory and writing the data to the second persistent memory.

3. The system of claim 2, wherein sending the indication to the storage client that the data has been successfully stored in the data storage system is based on completing writing the data to the first persistent memory or completing writing the data to the second persistent memory.

4. The system of claim 1, wherein the persistent memory comprises a first persistent memory and a second persistent memory, and wherein the first persistent memory and the second persistent memory are managed by a chunk store as a chunk domain.

5. The system of claim 1, wherein the operations further comprise:

updating a file mapping structure and a virtual chunk pointer while writing the data to the chunk storage.

6. The system of claim 5, where the operations further comprise:

omitting updating a file system metadata page or an inode during a chunk synchronization phase based on updating the file mapping structure and the virtual chunk pointer.

7. The system of claim 5, wherein updating the file mapping structure and the virtual chunk pointer comprises:

writing the file mapping structure and the virtual chunk pointer to the chunk storage; and omitting mapping the file mapping structure and the virtual chunk pointer to the persistent memory.

8. The system of claim 1, wherein writing the data to the persistent memory comprises:

associating the persistent memory stream with a logical inode of the persistent memory, wherein the persistent memory stream has a fixed size; and utilizing the logical inode for successive data writes until the persistent memory stream is filled.

9. A method, comprising:

maintaining, by a system comprising at least one processor, a data storage system, wherein the data storage system comprises persistent memory and chunk storage, wherein the persistent memory is more performant than the chunk storage, wherein the chunk storage stores data in chunks of a fixed-size, and wherein respective chunks of the chunks correspond to respective parity values;

based on receiving a request to write data to the data storage system, writing, by the system, the data to the persistent memory concurrently with writing the data to the chunk storage;

allocating, by the system, a persistent memory stream for the data, wherein writing the data to the persistent memory comprises writing the data to the persistent memory stream;

after completing writing the data to the persistent memory and before completing writing the data to the chunk storage, sending, by the system, an acknowledgment that the data has been successfully stored in the data storage system to an entity associated with the request;

after filling a chunk of the chunk storage, storing, by the system, a parity value of the respective parity values that corresponds to the chunk;

after storing the parity value, marking, by the system, the chunk as written; and after marking the chunk as written, freeing, by the system, the persistent memory stream.

10. The method of claim 9, further comprising:

acquiring, by the system, an exclusive data range lock on a portion of the chunk of the chunk storage that corresponds to writing the data to the chunk storage; and releasing, by the system, the exclusive data range lock after writing the data to the chunk storage.

11. The method of claim 10, wherein the request is a first request, and further comprising:

based on receiving a second request to read from the portion of the chunk while writing the data to the chunk storage, processing, by the system, the request to read from the portion of the chunk after completing writing the data to the chunk storage.

12. The method of claim 9, further comprising:

delaying, by the system, writing a write to a stripe of the chunk storage until one drive or fault domain's contribution to a chunk is filled.

13. The method of claim 9, wherein writing the data to the chunk storage comprises writing the data to the chunk of the chunk storage, wherein the chunk is associated with a chunk identifier, and wherein writing the data to the persistent memory comprises writing the data to a portion of the persistent memory that is associated with the chunk identifier.

14. The method of claim 9, wherein writing the data to the persistent memory comprises:

associating the persistent memory stream with a logical inode of the persistent memory, wherein the persistent memory stream has a fixed size; and utilizing the logical inode for successive data writes until the persistent memory stream is filled.

15. A non-transitory computer-readable medium comprising instructions that, in response to execution, cause a system comprising at least one processor to perform operations, comprising:

based on receiving a request to write data to a data storage system that comprises a persistent memory and a chunk storage, writing the data to the persistent memory in parallel with writing the data to the chunk storage;

allocating a persistent memory stream for the data, wherein writing the data to the persistent memory comprises writing the data to the persistent memory stream;

after completing writing the data to the persistent memory and before completing writing the data to the chunk storage, sending an acknowledgment that the data has been successfully stored in the data storage system to an entity associated with the request;

after filling a chunk of the chunk storage, storing a parity value that corresponds to the chunk;

after storing the parity value, marking the chunk as written; and after marking the chunk as written, freeing the persistent memory stream.

16. The non-transitory computer-readable medium of claim 15, wherein the persistent memory has a first sector size, wherein the chunk storage has a second sector size, and wherein the operations further comprise:

aligning writes to the persistent memory and the chunk storage based on the first sector size and the second sector size.

17. The non-transitory computer-readable medium of claim 15, wherein the persistent memory comprises a logical inode, and wherein the operations further comprise:

based on synchronizing or writing to the logical inode, hashing the logical inode to produce a hash; and storing a stream hash table entry for the hash that identifies a group of memory stream descriptor identifiers, wherein respective memory stream descriptor identifiers of the group of memory stream descriptor identifiers.

18. The non-transitory computer-readable medium of claim 17, wherein writing the data to the chunk storage comprises writing the data to the chunk of the chunk storage, and wherein the operations further comprise:

after completing writing the chunk, freeing a memory stream descriptor identifier that corresponds to the chunk, and removing the stream hash table entry that corresponds to the chunk from a stream hash table that comprises the stream hash table entry.

19. The non-transitory computer-readable medium of claim 15, wherein writing the data to the chunk storage comprises:

writing the data to a first sub-portion of the chunk of the chunk storage, wherein a second sub-portion of the chunk is empty after completing writing the data to the first sub-portion; and creating parity information for the chunk after filling the chunk.

20. The non-transitory computer-readable medium of claim 15, wherein performing data recovery for a node of the data storage system comprises:

reading stream descriptors from the persistent memory that are associated with the node;

rebuilding a table of stream descriptors based on the stream descriptors, wherein the table of stream descriptors is stored in computer memory;

modifying stream descriptors in the table of stream descriptors based on replaying a journal associated with the node, to produce a modified table of stream descriptors;

for respective stream descriptors in the modified table of stream descriptors that are associated with an ingesting state, marking respective associated chunks as finalized;

marking the respective stream descriptors as free; and synchronizing the respective stream descriptors to the persistent memory.

* * * * *